(12) United States Patent
Rood et al.

(10) Patent No.: US 8,080,095 B2
(45) Date of Patent: Dec. 20, 2011

(54) STEADY STATE TRACKING DESORPTION SYSTEM AND METHOD

(75) Inventors: Mark J. Rood, Champaign, IL (US); K. James Hay, Mahomet, IL (US); Byung J. Kim, Champaign, IL (US); Hamidreza Emamipour, Champaign, IL (US); Zaher M. Hashisho, Edmonton (CA)

(73) Assignee: The Board of Trustees of the University of Illinois, Urbana, IL (US)

( * ) Notice: Subject to any disclaimer, the term of this patent is extended or adjusted under 35 U.S.C. 154(b) by 265 days.

(21) Appl. No.: 12/296,121

(22) PCT Filed: May 9, 2007

(86) PCT No.: PCT/US2007/011242
§ 371 (c)(1),
(2), (4) Date: May 11, 2009

(87) PCT Pub. No.: WO2007/133602
PCT Pub. Date: Nov. 22, 2007

(65) Prior Publication Data
US 2009/0293725 A1    Dec. 3, 2009

Related U.S. Application Data

(60) Provisional application No. 60/799,269, filed on May 10, 2006.

(51) Int. Cl.
*B01D 53/04* (2006.01)
*B01D 53/30* (2006.01)

(52) U.S. Cl. .................. 96/109; 96/111; 96/112; 96/143

(58) Field of Classification Search ............... 96/109, 96/111, 112, 115, 134, 143; 95/1, 8, 11, 95/14, 18
See application file for complete search history.

(56) References Cited

U.S. PATENT DOCUMENTS

| | | | |
|---|---|---|---|
| 3,989,798 A | | 11/1976 | Greene et al. |
| 4,083,923 A | | 4/1978 | Lippman et al. |
| 4,552,570 A | * | 11/1985 | Gravatt ............................. 95/10 |
| 4,627,860 A | * | 12/1986 | Rowland ......................... 96/111 |
| 5,170,726 A | | 12/1992 | Brashears et al. |
| 5,200,033 A | | 4/1993 | Weitzman |
| 5,563,282 A | | 10/1996 | McCain et al. |
| 5,628,819 A | | 5/1997 | Mestemaker et al. |

(Continued)

OTHER PUBLICATIONS

Mitsuma et al., Performance of Thermal Swing Honeycomb VOC Concentrators, *Journal of Chemical Engineering of Japan*, 1998, pp. 482-484, vol. 31, No. 3.

(Continued)

*Primary Examiner* — Frank M Lawrence
(74) *Attorney, Agent, or Firm* — Greer, Burns & Crain Ltd.

(57) ABSTRACT

A preferred embodiment steady state tracking desorption system achieves steady tracking of either a fixed sorbate output set point, or a set point that changes over time. The system includes an electrically heated thermal adsorption/desorption device A temperature sensor senses the temperature of an adsorbent material within the adsorption/desorption device. A sorbate sensor senses a sorbate level from an outlet of the adsorption/desorption device. A power sensor senses the power supplied by the desorption device. A controller interprets levels sensed by the temperature sensor, the sorbate sensor and the power sensor and provides a signal to achieve steady set point tracking of a sorbate level from the outlet of the adsorption/desorption device.

20 Claims, 10 Drawing Sheets

U.S. PATENT DOCUMENTS

| | | | |
|---|---|---|---|
| 5,653,139 | A | 6/1997 | Holst et al. |
| 5,650,128 | A | 7/1997 | Holst et al. |
| 5,676,738 | A | 10/1997 | Cioffi et al. |
| 5,697,168 | A | 12/1997 | Matthys et al. |
| 5,814,234 | A | 9/1998 | Bower et al. |
| 5,904,750 | A | 5/1999 | Cowles |
| 6,027,550 | A | 2/2000 | Vickery |
| 6,110,361 | A | 8/2000 | Bower et al. |
| 6,364,936 | B1 | 4/2002 | Rood et al. |
| 6,372,018 | B1 | 4/2002 | Cowles |
| 6,527,836 | B1 | 3/2003 | White et al. |
| 6,658,757 | B2 | 12/2003 | Fout et al. |
| 6,660,063 | B2 | 12/2003 | Tom et al. |
| 6,726,746 | B2 | 4/2004 | Dai et al. |
| 6,886,273 | B2 | 5/2005 | Fout et al. |
| 7,862,646 | B2 * | 1/2011 | Carruthers et al. ............. 95/131 |
| 2002/0098133 | A1 | 7/2002 | Jewell et al. |
| 2002/0100710 | A1 | 8/2002 | Hogan |
| 2002/0169068 | A1 | 11/2002 | Dai et al. |
| 2003/0079370 | A1 | 5/2003 | Fout et al. |
| 2004/0064969 | A1 | 4/2004 | Fout et al. |
| 2005/0139546 | A1 | 6/2005 | Burke |

OTHER PUBLICATIONS

Munters Brochure; Zeolite Rotor Concentrations, 2003 Munters Corporation.

Webster et al., The Application of a Microwave Concentrator/Biofilter Integrated System to Treat Paint Booth Emissions, Environgen, Conference Proceedings, Oct. 2000.

Kodama et al., Performance Evaluation for a Thermal Swing Honeycomb Rotor Adsorber Using a Humidity Chart, *Journal of Chemical Engineering of Japan,* pp. 19-24, 1995, vol. 28, No. 1.

Blocki, Stephen W., Comparison of a Regenerative Thermal Oxidizer to a Rotary Concentrator, pp. 1-6, May 10, 2005.

Hashisho et al., Microwave-Swing Adsorption to Capture and Recover Vapors from Air Streams with Activated Carbon Fiber Cloth, *Environmental Science & Technology,* 2005, pp. 6851-6859, vol. 39, No. 17.

Hashisho et al., Rapid Response Concentration-Controlled Desorption of Activated Carbon to Dampen Concentration Fluctuations, *Environmental Science & Technology,* 2007, pp. 1753-1758, vol. 41, No. 5.

* cited by examiner

Steady-state desorption at low outlet concentration (100s ppmv).

Steady-state desorption at high outlet concentration (1,000s ppmv).

Dynamic steady-state desorption at low (500 ppmv), intermediate, and high (5,000 ppmv) outlet concentrations.

STEADY STATE TRACKING DESORPTION SYSTEM AND METHOD

STATEMENT OF GOVERNMENT INTEREST

This invention was made with Government support under the following Contracts: 1) U.S. Army Engineer Research and Development Center—Construction Engineering Research Lab (ERDC-CERL) Contract No. W9132T-04-2-0006; and 2) National Science Foundation Contract No. BES 0504385, DMI 02-17491.

REFERENCE TO RELATED APPLICATION AND PRIORITY CLAIM

This application is related to and claims priority pursuant to 35 U.S.C. §119 from provisional application Ser. No. 60/799,269, which was filed May 10, 2006 and entitled STEADY STATE TRACKING DESORPTION SYSTEM AND METHOD.

FIELD

The field of the invention is vapor and gas stream treatment.

BACKGROUND

Various industrial processes produce vapors and gases. These vapors and gases should be treated to avoid release of pollutants into the atmosphere. Other industries produce by-product vapors and gases, e.g., manufacturing of paint or polyethylene. Recapture of these by-products increases the yield of a manufacturing process. Various processes have been developed to treat vapor and gas streams to serve these and other applications. Each seeks to remove vapors and gases from a gas stream.

Adsorption is a particularly useful technique. Adsorption removes a wide range of gas stream components. Adsorption process typically includes an adsorption step and a desorption step. During the adsorption step, the gas stream is brought into contact with sorbent such as activated carbon or zeolites. Vapors and gases adhere to the sorbent carbon or zeolite due to molecular attractive forces. The adsorbed vapors and gases (sorbate) are released from the adsorbent during the desorption step. They are typically released by lowering pressure or by raising temperature. A typical method to raise temperature is by injection of steam. In the conventional processes, released adsorbed gases are often burned or converted to liquid through a condensation system that is located downstream of the desorption flow from an adsorption/desorption system.

Other emission control techniques include material substitution, thermal oxidation, membrane filtering, biofiltration, and absorption. The adsorption technique is advantageous due to its wide ranging applicability, comparatively low energy requirements, and its ability to recover gas stream components which have been recaptured. Adsorption also offers selectivity. Selectivity results if the temperature in the adsorption/desorption system can be controlled during the adsorption step because different vapors and gases will adsorb to the sorbent carbon or zeolite at different temperatures. Selectivity has become better controlled with the use of activated carbon fiber cloth (ACFC) as a sorbent, which has also yielded additional improvements to adsorption. ACFC has approximately twice the capacity of conventional adsorbents. It permits the rapid capture of volatile organic contaminants even when the contaminants have low concentrations in the gas stream. ACFC is ash free, which inhibits reactions with vapors such as ketone containing organic compounds and alkenes. Many ACFC processes follow the model of the above described adsorption/desorption processes, with ACFC taking the place of beds of zeolites or granular carbon.

Adsorption/desorption systems provide for the collection and subsequent treatment of adsorbate. Biofilters and oxidizers are typically used for destruction of the sorbate from high flow rate gas streams. Biofilters and oxidizers need to be designed to tolerate the swings in concentration in the sorbate concentration within gas streams. The input fluctuations in adsorbed vapors and gases result in over-designing of biofilters and oxidizers. Use of an adsorption/desorption system upstream of these devices allows for the gas stream to be treated by the biofilter or oxidizer at a much lower flow rate and at a constant concentration specifically designed for that downstream device.

U.S. Pat. No. 6,364,936 to Rood et al. advanced the state of the art for AFCF processes. The '936 describes devices and method that provide for the selective sorption and desorption of vapors and gases with electrically heated activated carbon fiber cloth elements. Sorbate output by the devices in the '936 patent is either in liquid or gas phase. Devices described in the '936 patent include an adsorption/desorption system having one or more elongated hollow ACFC elements. The geometric configuration of the ACFC element or elements is designed such that the elements have an electrical resistance value sufficient to permit heating of the elements by electrical current to a temperature that permits adsorption of a select gas stream constituent or constituents. The geometry also permits gas flow to penetrate the ACFC element(s). An enclosure houses the ACFC elements and is arranged to direct a gas stream through the elements and into and out of the enclosure via gas ports. The ability to heat the elements to a desired temperature by electrical current allows for straightforward implementation of selective adsorption. After an adsorption step, altering the temperature of the element or elements further enables desorption.

SUMMARY OF THE INVENTION

A preferred embodiment steady state tracking desorption system achieves steady tracking of either a fixed sorbate output set point, or a set point that changes over time. The system includes an electrically thermal adsorption/desorption device. A temperature sensor senses the temperature of an adsorbent material within the adsorption/desorption device. A sorbate sensor senses a sorbate level from an outlet of the adsorption/desorption device. A power sensor senses power supplied by the power supply. A controller interprets levels sensed by the temperature sensor, the sorbate sensor and the power sensor and provides a signal to achieve steady set point tracking of a sorbate level from the outlet of the adsorption/desorption device.

DETAILED DESCRIPTION OF THE PREFERRED EMBODIMENTS

Figure 1:
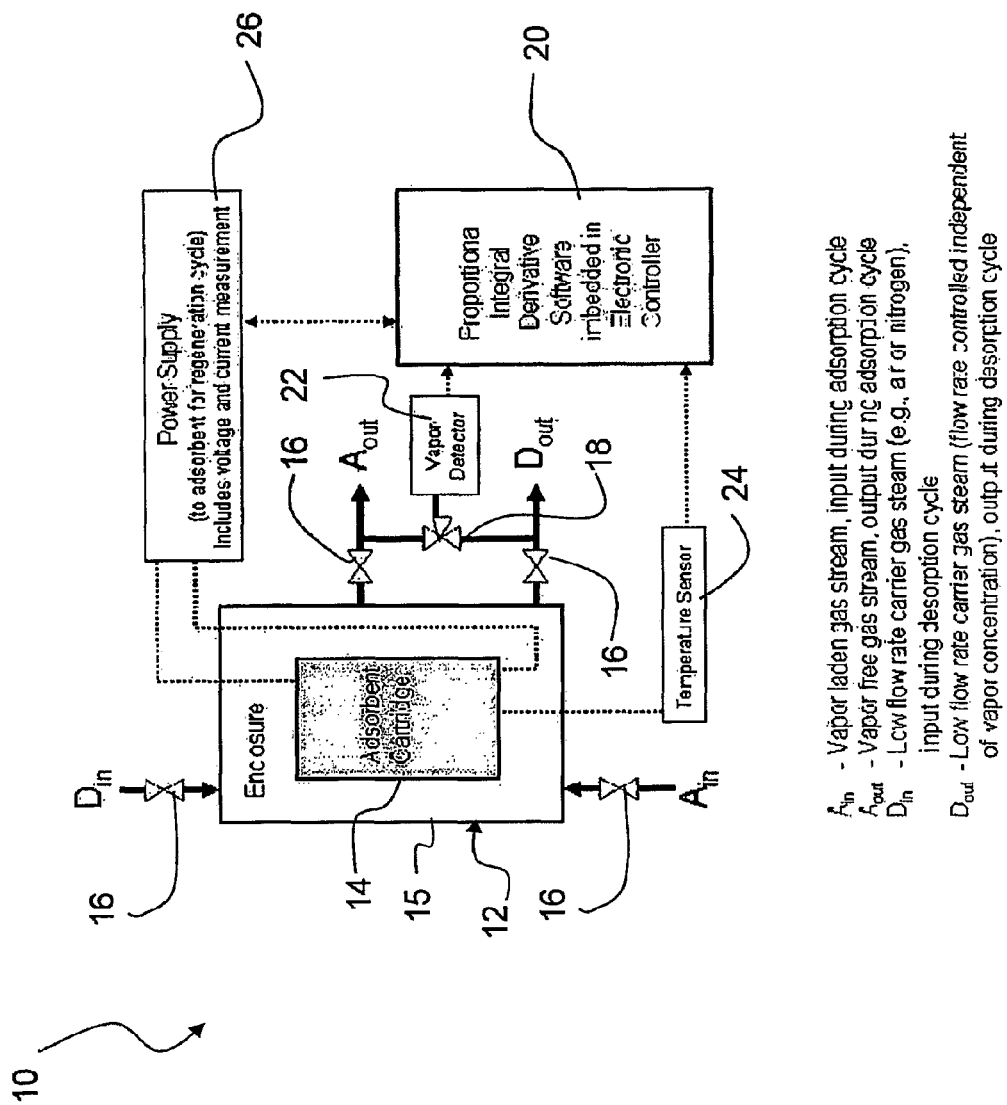
FIG. 1 is a schematic diagram of a preferred embodiment steady state desorption system of the invention.

The invention provides methods and systems that achieve adsorption of vapors and gases from a wide range of conditions and then provides for the steady state set point tracking desorption for subsequent destruction or treatment. The output sorbate gas stream can be maintained at a steady state sorbate concentration to track a fixed set point or can steadily track a set point that changes over time. The steady state sorbate concentration can be high, for example, if the subsequent process is to be combustion. The steady state sorbate concentration can be low, for example, if the subsequent process is biofiltration.

Preferred embodiment systems tolerate a very wide range of input stable or unstable sorbate concentrations while providing a high collection efficiency, e.g., >99%, and then provide for desorption of the sorbate in air or another carrier gas at a steady state tracking (likely much lower) total gas output flow rate and with a highly stable and easily controlled steady state tracking sorbate concentration. Sorbate concentration in the output gas stream can be controlled at a steady state tracking high concentration (e.g., 1,000's of ppmv) to allow for efficient combustion with a much smaller oxidizer than is typically used in conventional adsorption/desorption/destruction systems. Alternatively, a higher rate of combustion can be achieved with a typically sized oxidizer. Preferred embodiment systems can also provide a predetermined steady-state tracking desorption output at a low concentration (e.g., 100's of ppmv) to allow for efficient biofiltration with a biofilter that is much smaller than biofilters used in conventional adsorption/desorption/treatment systems. Downstream systems in a preferred embodiment desorption, destruction and collection system using steady-state tracking desorption in accordance with the invention can be precisely sized, as the typical swings in output gas stream sorbate concentration levels need not be accounted for in the design of a downstream system, e.g., an oxidizer or biofilter.

Use of the invention can also reduce greenhouse gas emissions. When steady state desorption of the invention is used, less carbon dioxide is produced, especially when a thermal oxidizer is used for downstream destruction of desorbed sorbate.

Methods and systems of the invention make use of an ACFC desorber device that can have its adsorption and desorption cycles electrically and precisely controlled. Preferred embodiments use a gas phase sorbate output ACFC cartridge desorber device disclosed in U.S. Pat. No. 6,364,936. Other types of adsorbents that can be electrically heated can also be used in systems of the invention, e.g., beads and monoliths.

Example additional materials are disclosed in "Adsorption and Electrothermal Desorption of Organic Vapors Using Activated Carbon Adsorbents with Novel Morphologies", Luo et al., Carbon, 44, 2715-2723, (2006). Other examples include activated carbons such as monolith, beads and fiber cloths that can effectively capture organic vapors and be electrically heated (e.g., by electrical resistance or microwave heating).

In a preferred system of the invention, an electrically heated ACFC cartridge desorption device is controlled to provide adsorption cycles and desorption/regeneration cycles that occur on an alternating basis. There are two or more adsorption/desorption cartridges in the electrically heated ACFC cartridge desorption device. A controller directs the amount of electrical heating of each of the cartridges in the desorption devices to create adsorption and desorption cycles. While one cartridge is heated to perform an adsorption cycle, the other cartridge is heated to perform steady-state tracking desorption. The gas flow and sorbate concentration in an output gas stream is monitored by the controller, and the electrical heating to achieve desorption is controlled to provide a steady state tracking concentration of sorbate in the output gas stream that meets a concentration required by a downstream device, such as an oxidizer or biofilter.

Particular preferred systems and methods will now be discussed with respect to the drawings. Schematic representations will be understood by artisans. From the particular preferred embodiments, artisans will appreciate broader aspects of the invention and will also recognize variations and additional embodiments.

Referring now to FIG. 1, a preferred embodiment steady-state tracking desorption system 10 is shown. The system 10 includes an electrically heated ACFC desorber device 12, preferably including at least two ACFC cartridges housed in a vessel 15. Heating is accomplished electrically, such as by electrical resistance heating or electrical microwave heating. A single cartridge 14 is illustrated in FIG. 1 for simplicity of illustration, though a single cartridge can also be used in practice. Valves 16 control gas flows into and out of the desorber device 12. An additional valve 18 provides output gas vapor samples to a vapor detector 22, which determines sorbate concentration. The sorbate concentration data are provided to a controller 20. The controller 20 also receives temperature data from a temperature sensor 24 that monitors the temperature of the ACFC cartridge 14. The concentration data and temperature data are used by the controller 20 to set and continue to adjust power output of a power supply 26 that provides power to heat the ACFC cartridge 14. The power is adjusted, as needed to maintain a steady state tracking sorbate concentration in an output gas stream $D_{out}$. The sorbate concentration can be set to match the requirement of a downstream system, such as a destruction or treatment system. The input carrier gas flow rate $D_{in}$ (and accordingly the output carrier case flow rate) can be set by the controller 20 or another device independently of the sorbate concentration.

The steady state tracking sorbate concentration can be considered a set point. The set point can be changed as needed to meet different demands of different downstream systems, which can, for example, be switched in and out of the output gas flow of the desorber device 12.

During adsorption, the controller 20 controls the power supply 26 to maintain the temperature of the ACFC cartridge 14 to an adsorption temperature. The concentration data from an adsorption output gas stream $A_{out}$ can be examined to ensure adsorption is occurring. Adjustments can be made to account for different contaminants for adsorption, which may adsorb at different temperatures. The input adsorption gas stream $A_{in}$ can have a much higher flow rate than the output desorption gas stream. Use of multiple desorber devices 12 is a preferred way to achieve concomitant adsorption and desorption, and a low desorber output gas flow rate $D_{out}$ and steady state tracking concentration can be realized while typical variations in the input flow rate $A_{in}$ and contaminant concentration occur.

An example adsorption/desorption cycle will be discussed. An initial adsorption cycle consists of passing a gas stream $A_{in}$ that contains a stable or unstable concentration of adsorbate through desorber device 12. During this initial adsorption cycle, the controller 20 controls the power supply 26 such that it maintains the ACFC cartridge 14 at an adsorption temperature. The duration of the adsorption cycle is determined by a pre-defined time period or when breakthrough occurs. The vapor detector 22 determines when breakthrough occurs. Breakthrough is determined by detection of the adsorbate at a specified gas-phase concentration at the outlet of the adsorption vessel (e.g., outlet concentration equals 5% of the inlet concentration). The adsorption cycle is then stopped.

The desorber device 12 is now ready for a desorption cycle. The purge gas flow rate $D_{in}$ & $D_{out}$ during the desorption cycle can be, for example, 1% or less of the gas flow rate during the adsorption cycle. The flow rate is independent of the steady state tracking sorbate concentration in $D_{out}$. The reduced gas flow rate with independently maintained sorbate concentration results in the ability of using smaller downstream processing systems, e.g. biofilter or oxidizer, than is possible without the use of the steady-state desorption system. In preferred methods, the systems' vapor laden inlet gas stream $A_{in}$ is directed to a second cartridge 14 or a second device 12 that has completed its desorption cycle, if continuous treatment of the inlet gas stream is needed before the gas stream $D_{out}$ is emitted to the atmosphere.

In preferred embodiments where electrical resistance is used to heat the ACFC element 14, the elongated nature of the ACFC element 14 compared to a relatively small cross section provides electrical resistance, which can be further increased where multiple ACFC elements are connected electrically in series. The shape of the ACFC element 14 does not have to be cylindrical, though the illustrated cylindrical shape is easy to form. The ACFC that makes the element 14 can be pleated or any other configuration to allow for adsorption of the gas or vapor. The ACFC material can also be layered, or can be formed in a single piece of suitable thickness to resist fluid flow and permit gas penetration. The ACFC element 14 is configured to permit electrical heating a temperature sufficient for adsorption of a desired component in a gas flow.

Figure 2:
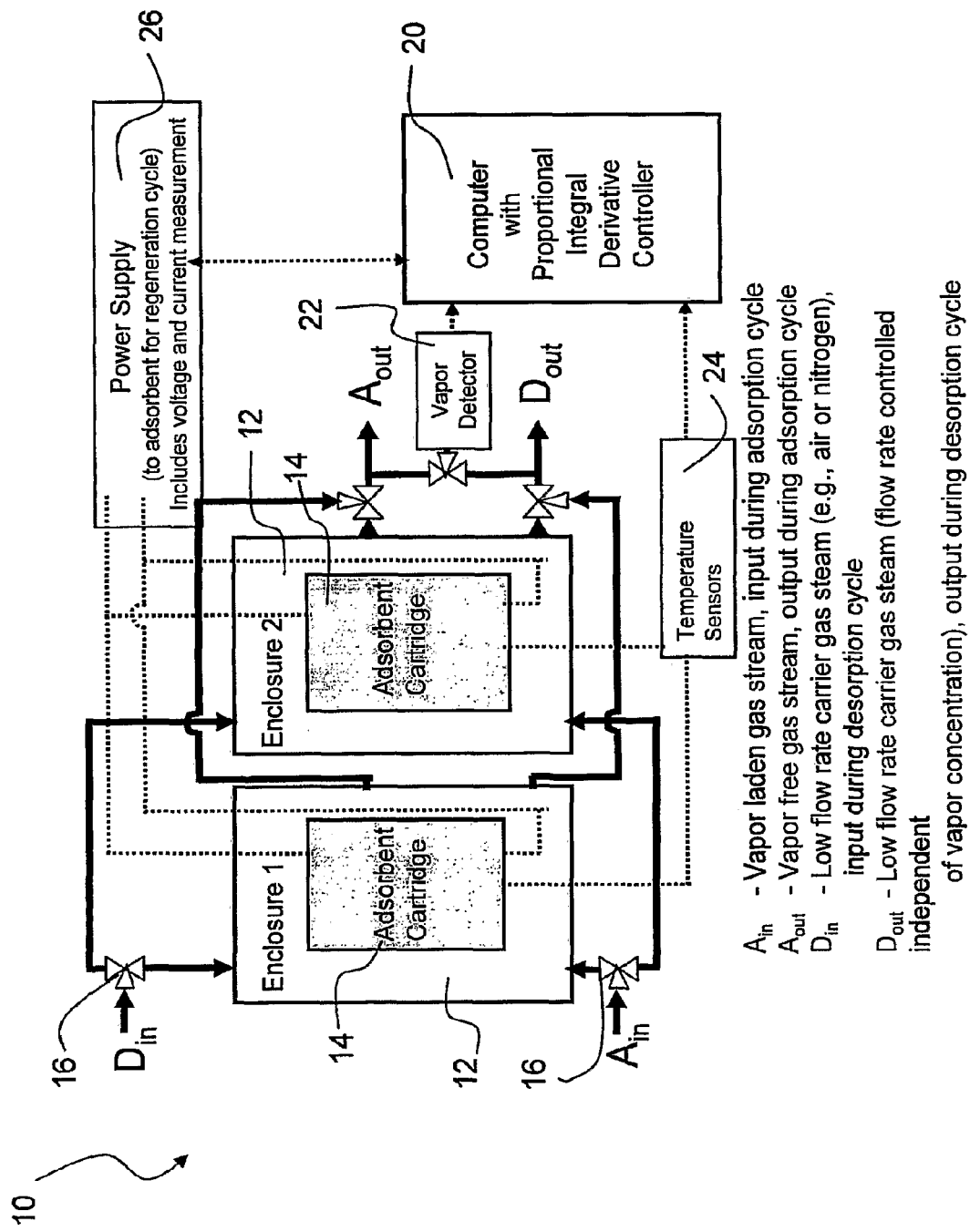
FIG. 2 is a schematic diagram of another preferred embodiment steady state desorption system.

FIG. 2 shows another preferred embodiment system. The system is similar to the system of FIG. 1, but includes a second desorber device 12. A preferred embodiment concomitant adsorption and desorption method will be discussed with reference to operations of the controller 20.

The controller 20 (see FIGS. 1 and 2) can adjust the electrical power to particular set points to provide good temperature selectivity, and the ability to selectively adsorb different constituents since different constituents adsorb at different temperatures. A series of units or elements which are heated to different temperatures may be used to remove different constituents in series fashion. The well known relationship between length, cross section, and material properties determines electrical resistance of an individual ACFC element of the invention or a series combination of such elements.

One or more temperature sensors 24 are used to monitor temperature of an ACFC element. Gas flow is directed through the ACFC element(s) when the elements have been heated to a temperature to accomplish adsorption to remove a component from a gas stream. During desorption, steady-state tracking control is accomplished by the controller 20. A gas (e.g., air or nitrogen) is used to purge the desorber device (s) 12 during desorption. The low flow rate gas preferably flows in the opposite direction during desorption as the gas flow during adsorption. Reverse flow can help purge high boiling point constituents from the ACFC elements. An inert gas can be used to displace oxygen from the air in adsorber system 40 to prevent oxidation from occurring during desorption. Air works well as the carrier gas when oxidation is not a concern, and is a preferred carrier gas for its ready availability and lack of cost.

With reference again to the systems of FIGS. 1 and 2, the controller 20 can be realized in software, hardware or combinations thereof, and can be separate or integrated with its associated sensors 22, 24 and power supply 26. The controller 20 can include software and hardware modules to provide for data acquisition and control of the system's adsorption cycles and the steady-state tracking desorption cycles. The software allows for acquisition of the signals from the sensors 22, 24 (and feedback from the power supply 26), determination of set-points for the signals, processing of the signals, and then output of the signals to the devices being controlled, which include the power supply 26 and can include the valves 16, 18 as well. Integration of the hardware and software allows for signal acquisition and control from a wide range of inputs and/or outputs, such as voltages, currents, thermocouples, and relays that allow for a carefully controlled rate of desorption for the adsorbate into the purge gas stream.

Figure 3:
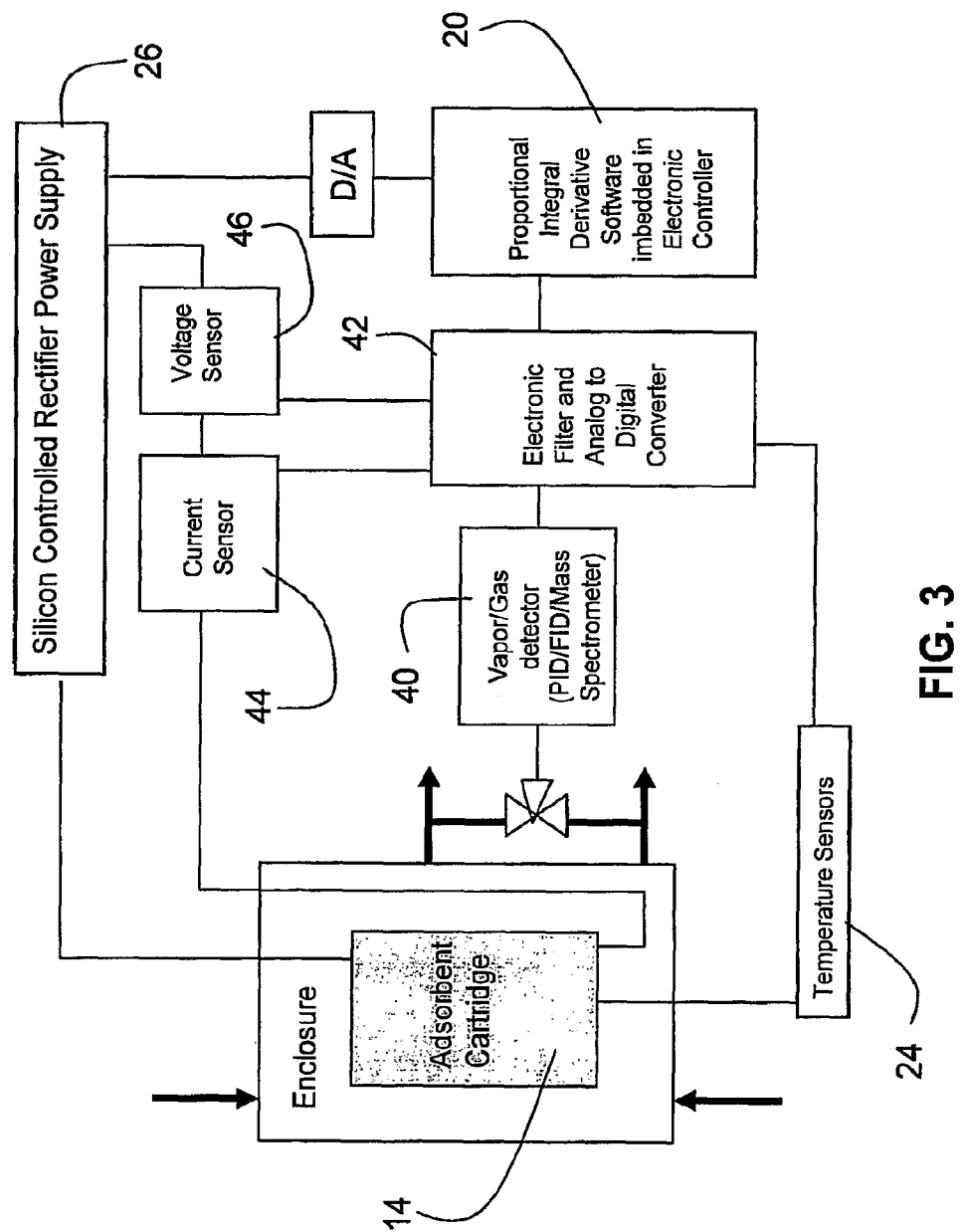
FIG. 3 illustrates a preferred embodiment electrical hardware system for use with the systems of FIGS. 1 and 2.

FIG. 3 illustrates a preferred embodiment electrical hardware system for sensing and feedback to the controller 20. In preferred embodiments, analog inputs are sensed and converted to digital data to be used by the controller 20. The vapor/gas detector shown in FIGS. 1 and 2 is, for example, a photoionization detector (PID), flame ionization detector (FID), or mass spectrometer 40 that provides an analog output to a signal conditioner 42. The signal conditioner 42 filters the signal and converts it to digital for use by the controller 20. The filtering removes noise from the signals received by sensors, e.g., the temperature sensor 24.

Many types of noise filters can be used to remove noise from signals received from the sensors, and the point of filtering is to provide clean data to the controller 20. In experimental embodiments 60 Hz filters were used as noise reduction filters. The filter in experimental embodiments was included in interface hardware produced by National Instruments. The 60 Hz filters were embedded in the data acquisition hardware that are used between the various sensors and the electronic controller. These filters are intended to reduce electronic noise caused by electrical connections and/or high voltage equipment that are operationally close to the data acquisition system.

The signal conditioner 42 also provide an electrical isolation barrier that protects the signal conversion circuitry, as well as the controller 20 from high power signals, e.g., 120 V supplied by the power supply 26 to the cartridge 14 to regenerate the adsorbent. Such protection is important if a temperature sensor 24 is used that is the type of sensor that is physically attached to the cartridges, e.g., a thermocouple. The signal conditioner also receives signals from a current sensor 44 and a voltage sensor 46, and provides the controller 20 with a digital signal that is proportional to the current and voltage supplied by the power supply 26.

Figure 4:
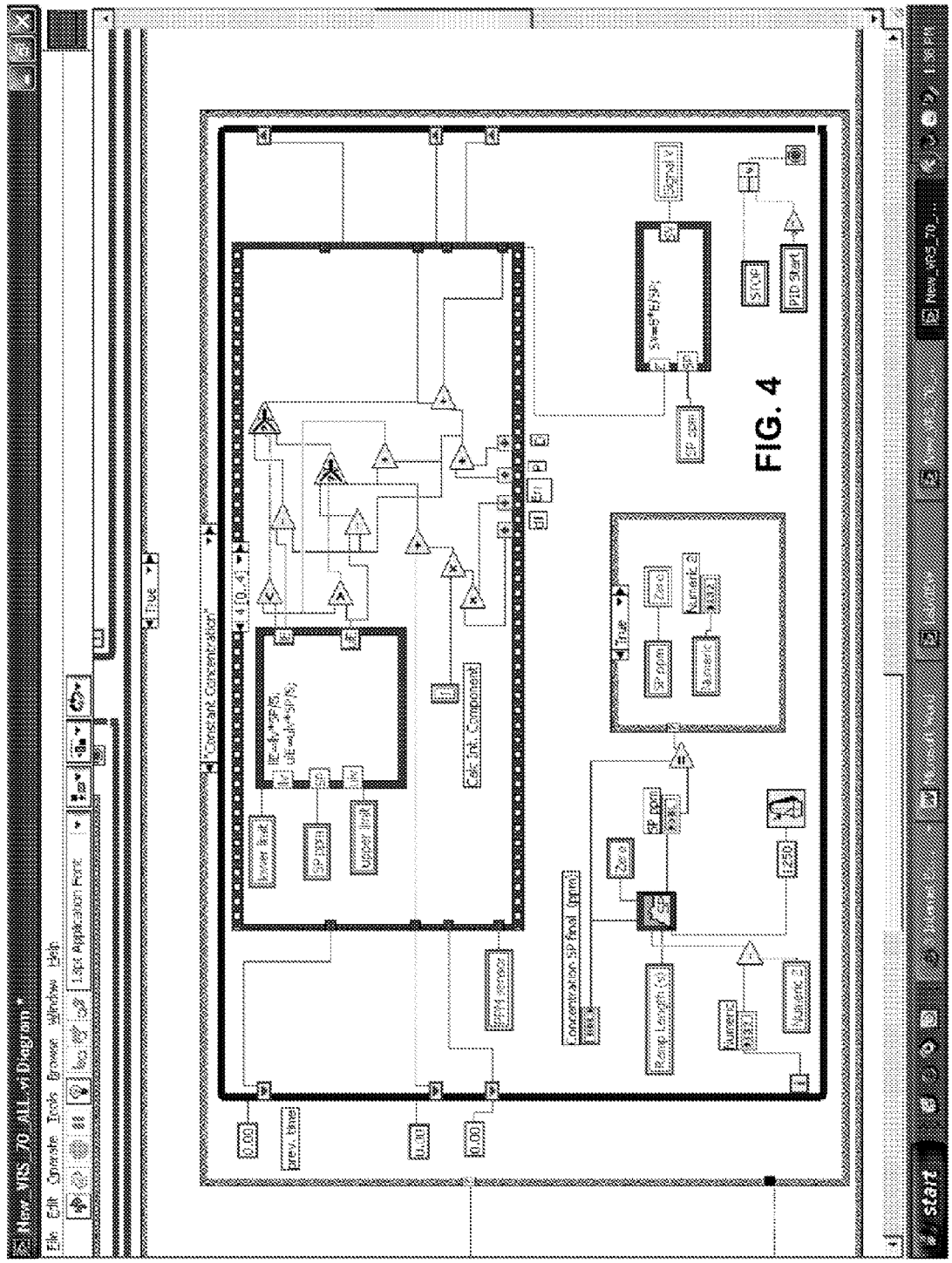
FIG. 4 illustrates a preferred embodiment control algorithm for the controllers of FIGS. 1-3.

The controller 20 detects and stores input signals concerning temperature and power from the sensors 24, 44, 46, and then processes the signals with a feedback control algorithm (preferably a proportional-integral-derivative algorithm) to determine the magnitude of the analog output signals that are used to control the vapor concentration at the outlet of the adsorption vessel. FIG. 4 represents the flow of a preferred proportional-integral-control algorithm.

FIG. 4 shows how the software in the controller 20 of a preferred experimental embodiment controls the steady state tracking desorption cycle. Table 5 below provides details of variables used in the control algorithm in an experimental embodiment of the invention. The software shown in FIG. 4 processes the output of the sensors (vapor/sorbate detector 22, temperature sensor 24, and power sensors (voltage and current sensors 44 and 46). These parameters are compared to predefined set-point values for those parameters. The proportional integral derivative algorithm then determines new output signal(s) to maintain sorbate level set point tracking. The particular control algorithm embodiment represented in FIG. 4 is implemented with automation software, available commercially, for example, from LabView, Rockwell Automation, Wonderware, Honeywell, Siemens, AutomationDirect, Fisher-Rosemount and GE Fanuc. Other methods of coding suitable control algorithms in software, firmware or hardware will be apparent to artisans. The graphical programming of the automation software packages provides a convenient method to implement the control in preferred embodiment systems, however.

With reference again to FIGS. 1-4, the measured input signal (e.g., temperature of the adsorbent, electrical resistance of the adsorbent, and/or the gas-phase concentration of the adsorbate at the outlet of the vessel) is compared to a predefined set-point value that represents the desired condition for the outlet gas stream and/or adsorbent. The preferred proportional integral derivative algorithm in the controller 20 transforms the difference between the measured signal (e.g., vapor phase concentration and/or temperature of the adsorbent) and the desired set-point. The controller 20 outputs a signal proportional to this difference, in addition integrates the difference to force the controller to reach the desired set-point. The controller reacts to sudden changes (derivative feature) of this difference to improve controller performance. This new value of the output signal is sent to a digital-to-analog converter (D/A). The control signal from the converter provides the controlling signal to the power supply 26, which is preferably a Silicon Controlled Rectifier (SCR) power supply. The SCR 26 then applies a proportional amount of power (voltage and resulting current) to the cartridge(s) 14. An increase/decrease in the amount of power supplied to the cartridge(s) 14 results in an increase/decrease in the temperature of the cartridge(s) 14 and an increase/decrease in the amount of adsorbate that is emitted from the adsorbent. Consequently, the power supplied to the adsorbent acts as a correcting signal that reduces the gap between actual measured concentration and the pre-defined set-point concentration, which results in a carefully controlled vapor concentration in the gas stream that is emitted from vessel that is experiencing desorption at a carefully controlled purge gas flow rate. The desorption cycle continues while there is sufficient adsorbate in the cartridge(s) 14 to maintain the desired outlet vapor concentration or the actual temperature of the adsorbent achieves a maximum set-point value. The desorption cycle is then complete and the vessel is ready for its next adsorption cycle.

Experimental Data for Electrical Resistance Heating Prototype

A system of the invention has been tested. The experimental system was consistent with FIG. 2. The description of the experimental devices is included to demonstrate a preferred embodiment, and example performance. Artisans will recognize broader aspects of the invention from the example experimental embodiments and recognize that the invention is not limited thereto.

TABLE 1

Network Interface Characteristics

| Characteristics | Network Interface |
| --- | --- |
| Manufacturer code | FP-1000 |
| Type | RS-232 Standard (serial) |
| Max. number of modules per node | 9 |
| Communication rate | 115.2 kb/s |
| Networking | Expandable to 24 RS-485 banks in a single network |

TABLE 2

Input-Output Modules

| Module | Description |
| --- | --- |
| FP-8C-AI-M-1 | Analog Input |
| FP-8C-AI-M-2 | Analog Input |
| FP-8C-TC-M | Thermocouple Input |
| FP-8C-RLY-1 | Relay Output |
| FP-8C-RLY-2 | Relay Output |
| FP-2C-AO-M | Dual Analog Output |

TABLE 3

Specifications of Analog Input Modules

| Characteristics | Module FP-8C-AI-M-1 | Module FP-8C-AI-M-2 |
| --- | --- | --- |
| Manufacturer code | FP-AI-100 | FP-AI-110 |
| Input Voltage Ranges | ±1 V, ±5 V, ±15 V, ±30 V 0-1 V, 0-5 V, 0-15 V, 0-30 V | ±1 V, ±5 V, ±10 V 0-1 V, 0-5 V, 0-10 V ±60 mV, ±300 mV |
| Current (mA) | 0-20, 4-20, ±20 | 0-20, 4-20, ±20 |
| Resolution (bits) | 12 | 16 |
| Filters (Hz) | None | 50  60  500 |
| Update Period (s) | 0.0028 | 1.47  1.23  0.173 |
| Channels | 8 | 8 |

TABLE 4

Thermocouple Inputs to Analog Input Module FP-8C-AI-M-1

| Thermocouple | Code | Signal Range from Keithley Modules (V) | Channel Number |
| --- | --- | --- | --- |
| Vessel 1 - Cartridge A | T101 | 0-5 | 0 |
| Vessel 1 - Cartridge B | T102 | 0-5 | 1 |

TABLE 4-continued

Thermocouple Inputs to Analog Input Module FP-8C-AI-M-1

| Thermocouple | Code | Signal Range from Keithley Modules (V) | Channel Number |
|---|---|---|---|
| Vessel 1 - Cartridge C | T103 | 0-5 | 2 |
| Vessel 1 - Cartridge D | T104 | 0-5 | 3 |
| Vessel 2 - Cartridge A | T201 | 0-5 | 4 |
| Vessel 2 - Cartridge B | T202 | 0-5 | 5 |
| Vessel 2 - Cartridge C | T203 | 0-5 | 6 |
| Vessel 2 - Cartridge D | T204 | 0-5 | 7 |

TABLE 5

Constants used with the Proportional Integral Derivative with the Electronic Controller

| Proportional-Integral-Derivative Constants | Constants for Steady-State Desorption at 500 ppmv (FIG. 6) | Constants for Steady-State Desorption at 9,000 ppmv (FIG. 7) | Constants for Dynamic Steady-State Desorption between 500 ppmv and 5,000 ppmv (FIG. 8) |
|---|---|---|---|
| Proportional | 0.25 | 0.15 | 0.25 |
| Integral | 0.0025 | 0.0025 | 0.0025 |
| Derivative | 1.0 | 2.5 | 1.0 |

Data From Experimental Results

Figure 5:
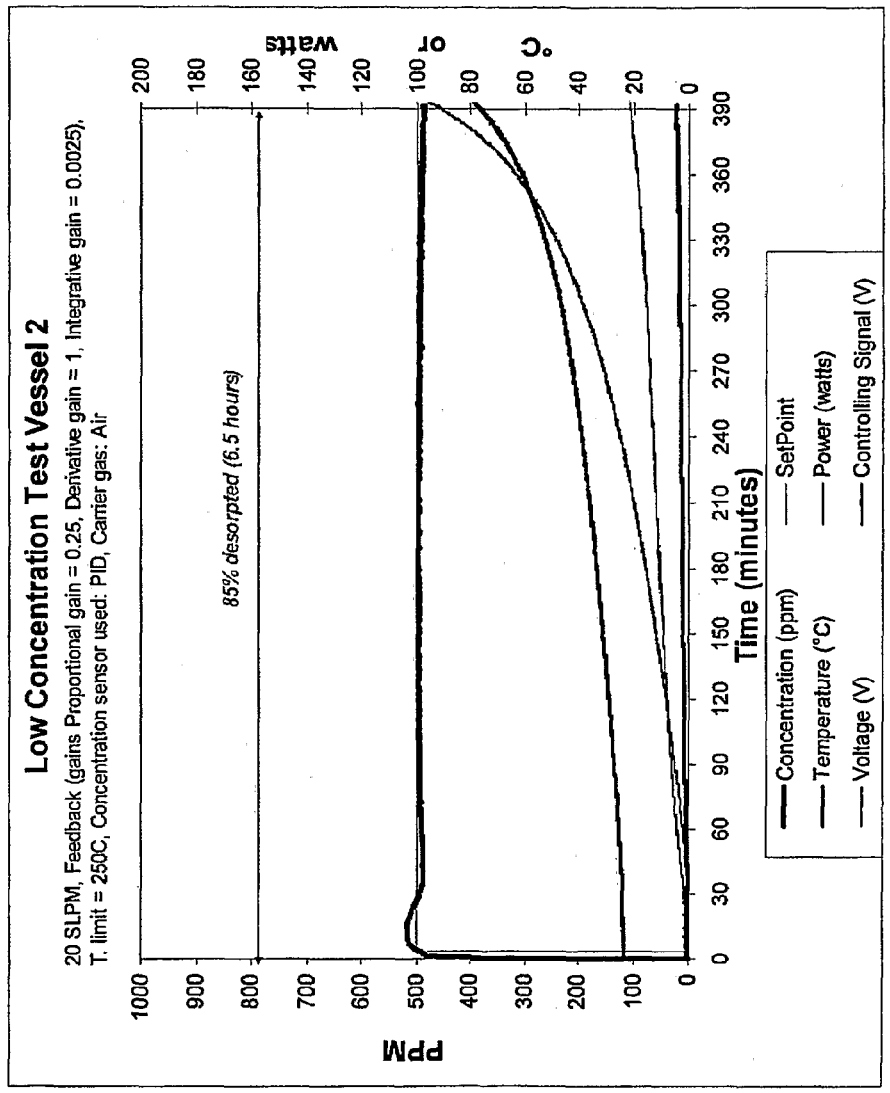
FIG. 5 graphs the steady-state desorption at low outlet concentration (100's ppmv) for an experimental system in accordance with FIG. 2.

FIG. 5 graphs the steady-state tracking desorption at low fixed set point outlet concentration (100s ppmv) for an experimental system in accordance with FIG. 2. FIG. 5 shows the results for "test vessel 2" at low outlet concentration. Gas flow during desorption was 20 SLPM (standard liters per minute at 0° C. and 1 atm). The cartridge was loaded during an adsorption cycle with an input concentration that was 500 ppm by volume at 100 SLPM of total gas flow rate. The feedback was operated with a proportional gain of 0.25, a derivative gain of 1, and integrative gain of 0.0025. The temperature limit was 250° C. Air was the carrier gas. A PID concentration sensor was used. As seen in FIG. 5, the steady state tracking desorption output of approximately 500 ppm is achieved almost immediately, and is maintained in a steady state tracking mode over the course of a 6.5 hour desorption cycle that achieved 85% desorption.

Figure 6:
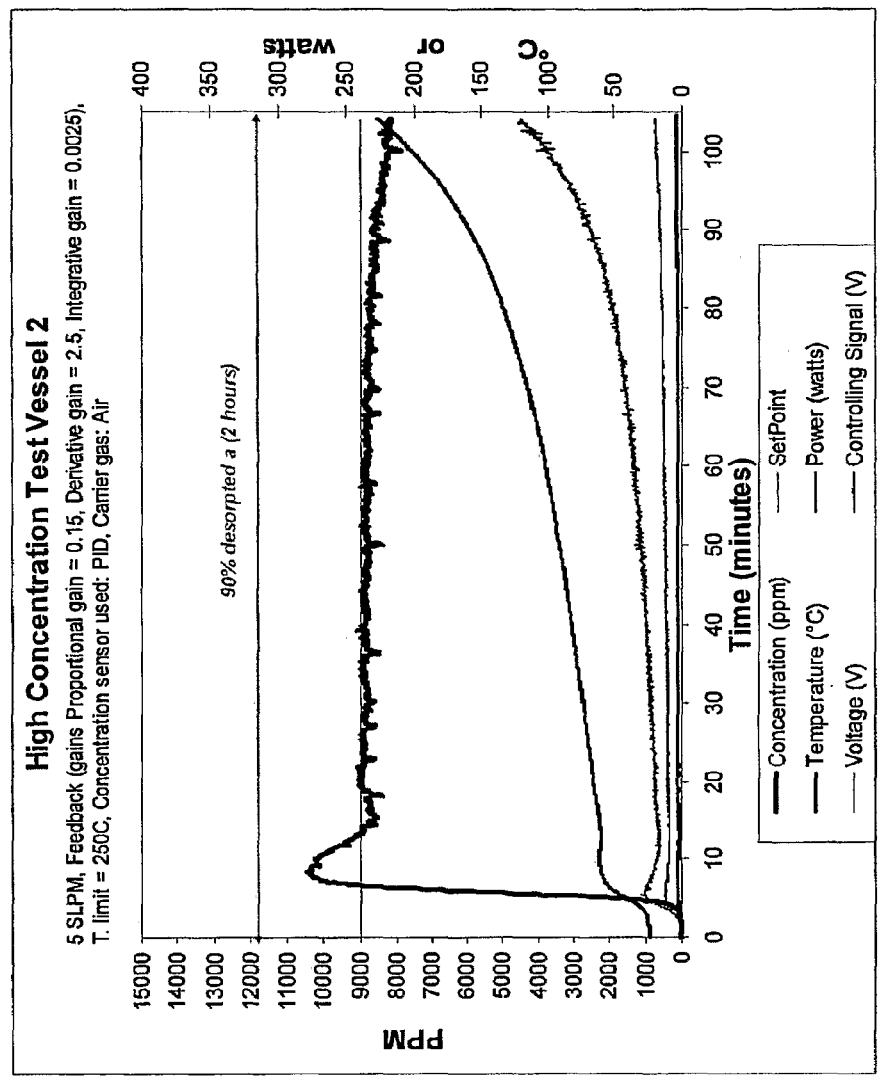
FIG. 6 graphs the steady-state desorption at high outlet concentration (1,000's ppmv) for the experimental system in accordance with FIG. 2.

FIG. 6 graphs the steady-state tracking desorption at high fixed set point outlet concentration (1,000s ppmv) for the experimental system in accordance with FIG. 2. The cartridge was loaded during an adsorption cycle with an input concentration that was 500 ppmv by volume at 100 SLPM of total gas flow rate. FIG. 6 graphs the steady-state tracking desorption at high outlet concentration (1000s ppmv) for an experimental system in accordance with FIG. 2. FIG. 6 shows the results for "test vessel 2" at low outlet concentration. The flow rate of carrier gas during desorption was 5 SLPM. The feedback was operated with a proportional gain of 0.15, a derivative gain of 2.5, and integrative gain of 0.0025. The temperature limit was 250° C. Air was the carrier gas. A PID concentration sensor was used. As seen in FIG. 5, the steady state tracking desorption output of approximately 9,000 ppmv is achieved within approximately 20 seconds with an initial short peak of less than 11,000 ppmv, and is maintained in a steady state tracking mode over the course of a 2 hour desorption cycle that achieved 90% desorption.

Figure 7:
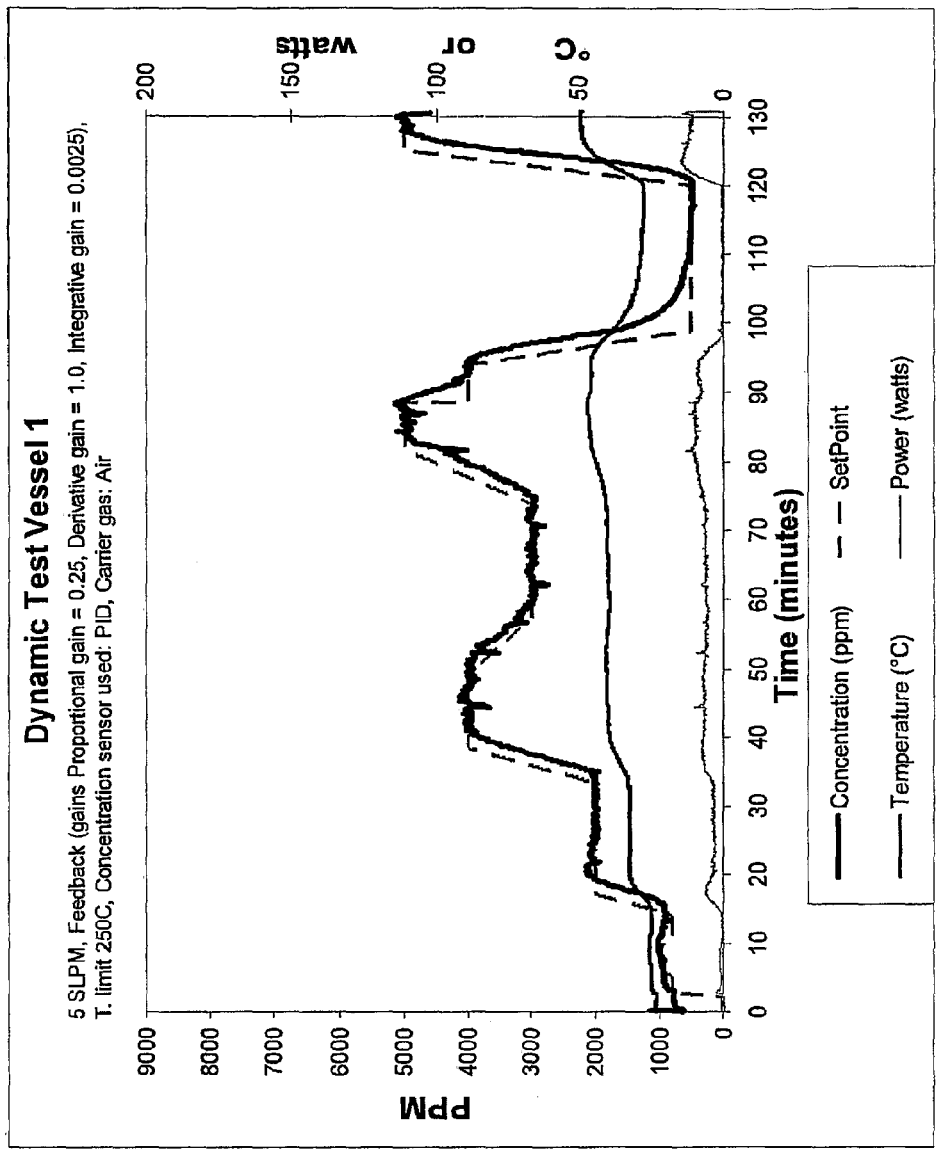
FIG. 7 graphs steady-state desorption at low (500 ppmv), intermediate, and high (5,000 ppmv) outlet concentrations for the experimental system in accordance with FIG. 2.

FIG. 7 graphs steady-state tracking desorption at multiple set points changed over time: low (500 ppmv), multiple intermediate, and high (5,000 ppmv) outlet concentrations for the experimental system in accordance with FIG. 2. The cartridge was loaded during an adsorption cycle with an input concentration that was 500 ppm by volume. FIG. 7 shows the results for "dynamic test vessel 1" at low, medium and high outlet concentration to demonstrate that a steady state tracking output set point can be changed effectively during operation and maintained for a desired period of time. Carrier gas flow rate during desorption was 5 SLPM. The feedback was operated with a proportional gain of 0.25, a derivative gain of 1, and integrative gain of 0.0025. The temperature limit was 250° C. Air was the carrier gas. A PID concentration sensor was used. The set point was increased and decreased multiple times during the desorption cycles, and the outlet concentration closely tracks the set point.

Preferred Embodiment System with Downstream Destruction/Collection

Another form of electrical heating is through microwave heating, which forms another preferred embodiment device. Systems are similar to the above discussed embodiments, except the heating is accomplished through microwaves instead of electrical resistance. Also, methods to dampen fluctuations are of interest to provide inputs to downstream destruction or collection systems, e.g., oxidizer and biofilter destruction systems or a concentrator to collect desorbed gases or vapors. A preferred embodiment system is a steady state tracking desorption system having output flow controlled and fluctuations in desorbed contaminants dampened to permit use of the downstream.

Figure 8:
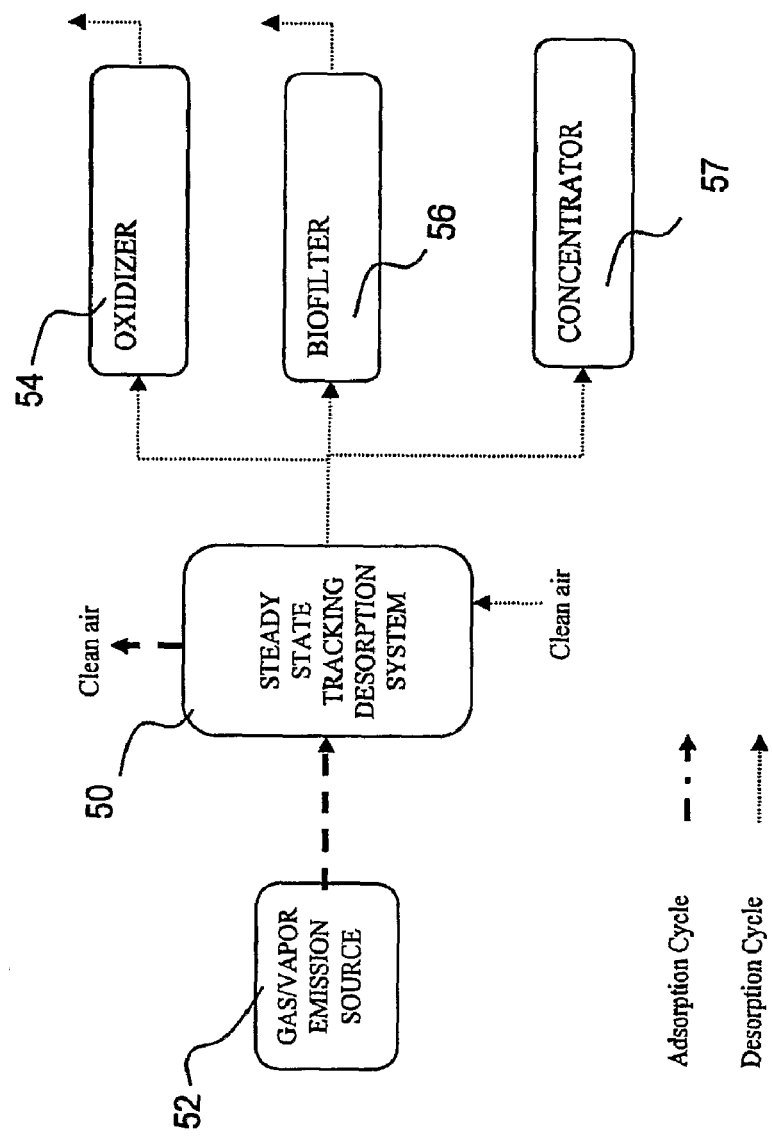
FIG. 8 is a schematic diagram of a microwave swing adsorption steady state desorption system of the invention.

FIG. 8 is a schematic diagram of steady state tracking desorption, collection and destruction system. The desorption, collection and destruction system includes a steady state tracking desorption system 50, such as the system shown in FIGS. 1-4. The system 50 receives gas streams from a gaseous or vapor source 52. Fluctuations in flow and contaminant levels from the source can vary greatly, but are dampened by the steady state desorption system 50 to levels suitable for destruction systems, e.g., an oxidizer 54 or a biofilter 56. A collection system can also be used, such as a concentrator 57. Adsorption and desorption flows are shown in FIG. 8, and clean air is input to the steady state desorption system 50 during the desorption cycle.

Microwave Heated Steady State Desorption Bench Scale System

Figure 9:
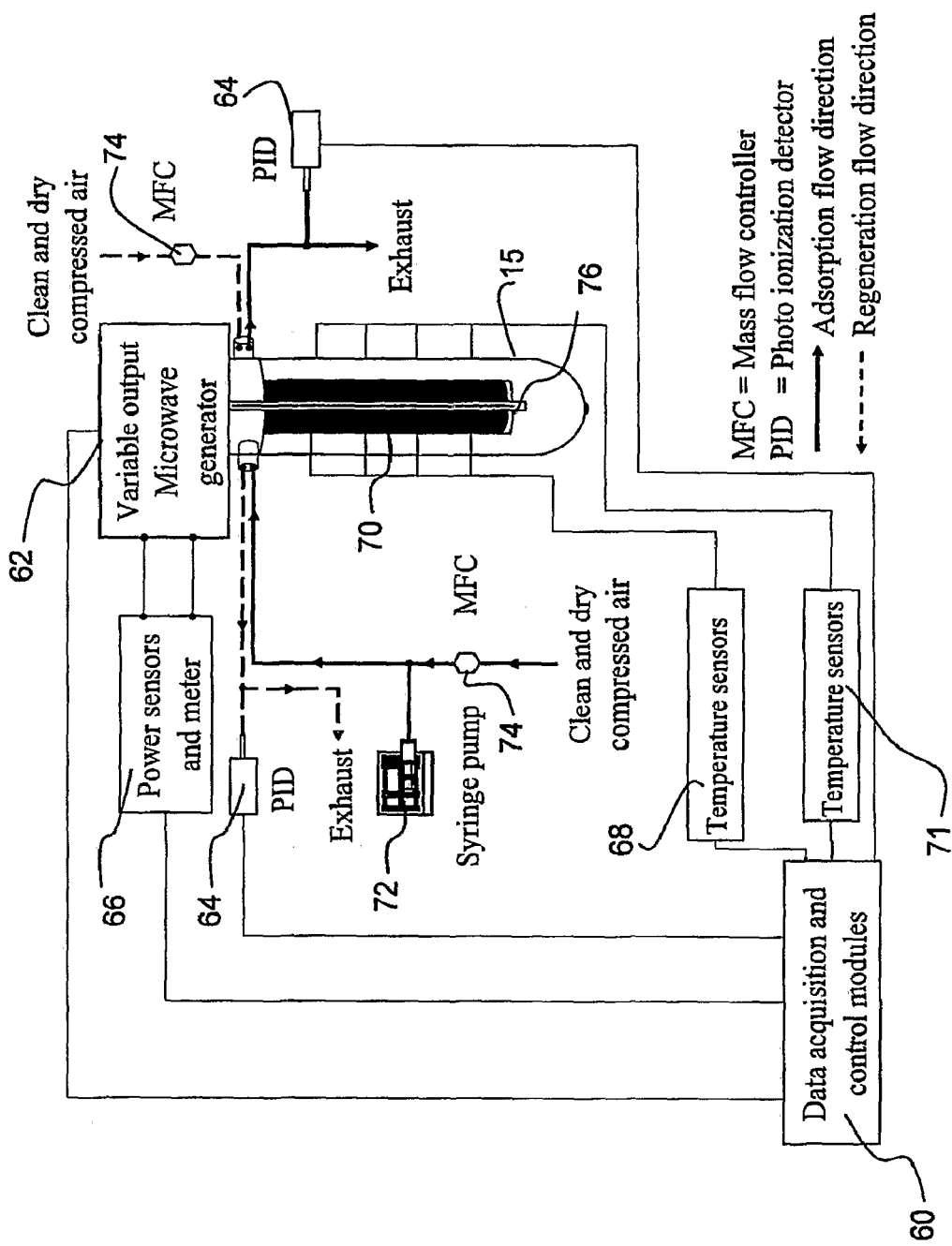
FIG. 9 illustrates the configuration of a bench scale microwave heated steady state desorption and tracking system representing a preferred embodiment.

FIG. 9 illustrates a configuration of a bench scale microwave heated steady state desorption and tracking system representing a preferred embodiment. The system is controlled by a proportional integral derivative control module implemented with a data acquisition module 60 that controls a variable output microwave generator 62 based upon information from a PIDs photoionization detectors 64, power sensors 66, temperature sensors 68 and 71. A syringe pump 72 was used to inject contaminants to create a contaminated gas stream with compressed dry air controlled by a mass flow controller 74 and an additional mass flow controller 74 was used during desorption (regeneration) cycles. The temperature sensors 68 provide information about the temperature of ACFC cartridge(s) 70 in vessel 15, and the second set of temperature sensors provide the temperature of the vessel's outer wall 15. The cartridge(s) are disposed around an antenna 76 that emits microwaves generated by the generator 62.

Experimental Data for Desorption System Prototypes

An experimental bench scale prototype consistent with FIG. 9 was tested, and a prototype having a similar configuration as the FIG. 9 system but including electrical resistance heating was also tested. The system was first tested to remove methyl ethyl ketone (MEK) from air streams. The MEK was then desorbed to provide readily controllable feed streams of MEK in air at a specified concentration and gas flow rate. MEK was adsorbed from air streams with a collection efficiency>99.8% up to 5% breakthrough and was then desorbed at constant outlet concentrations between 170 ppmv and 5,000 ppmv. Total gas flow rate during the desorption cycle was 20% of the gas flow rate during the adsorption cycle.

Testing was also conducted to test dynamic tracking, i.e., testing the ability of prototype microwave heated and electrical resistance heated systems to produce a range of outlet concentration set-points between 170 ppmv and 5,000 ppmv. The controlled outlet concentration rapidly and accurately followed the concentration set-points. This is an important ability for a desorption system to be optimized for use with secondary collection and/or destruction systems such as a biofilter or an oxidizer. With accurate set point tracking, for example, tailored HAP and VOC concentrations can be provided to such collection or destruction systems and at low total gas flow rates that are required for such collection and destruction systems.

The ACFC cartridge in the prototype microwave system contained 177 g of ACFC (ACC 5092-15, American Kynol Inc.) that was rolled around a Teflon-coated fiberglass mesh to form a 45 cm long cartridge with an outer diameter of 6.5 cm, an inner diameter of 6 cm. An electrical resistance heated prototype had an ACFC cartridge that contained 73.5 g of ACFC (American Kynol, ACC-5092-20) that was rolled into two annular cartridges.

For the microwave heated system, temperature of the ACFC cartridge was measured with fluoroptic temperature sensors (FOT Lab kit, Luxtron) that were located 7.5 cm, 19.5 cm, 32.0 cm and 36.0 cm from the top of the cartridge. Type K thermocouples (Omega Inc., 0.25 mm in diameter), were also attached to the outer wall of the vessel, at the same vertical positions as the fluoroptic sensors, to monitor the temperature of the vessel's outer wall. For the electrical resistance heated system, temperatures of the cartridges and external wall of the vessel were measured with Type K thermocouples (Omega Inc., 0.25 mm diameter) that were located at the vertical center of the cartridges and the cylindrical portion of the vessel's external wall.

For the microwave heated system, the power application system consisted of a 2 kW switch-mode power supply (SM840E, Alter), a variable output 2 kW and 2.45 GHz microwave head (MH2.0W-S1, National Electronics), an isolator (National Electronics), a tuner (National Electronics), a waveguide to coaxial transition with a sliding short, and an aluminum conductor. Power was monitored using a dual directional coupler with 60 db attenuation (Mega Industries), two power sensors (8481A, Agilent), and a dual channel microwave power meter (E4419B, Agilent). For the electrical resistance heated system, a silicon controlled rectifier (SCR, Robicon, Series 440) was used to control 120 V A.C. electric power that was supplied to the cartridges, which dissipated energy through Joule heating. Power supplied to the cartridges was determined by measuring the root mean square voltage and current for the ACFC cartridges that were located in series using National Instruments hardware.

Outputs from the gas detection system, power application and monitoring, and temperature measurement systems were connected to a data acquisition and control system that used National Instruments hardware and LabView software to provide continuous recording of the sensors' measurements and to control the power supplied to the ACFC during the desorption cycle. A proportional-integral-derivative algorithm was used to control the power supplied to achieve the specified set-point vapor concentrations.

Experimental Methodology:

The photoionization detectors were calibrated with MEK (HPLC grade, >99.5% purity) in air before each adsorption and regeneration test. Mass balances were used for the feed rates of the liquid MEK and air to determine the resulting concentrations of MEK vapor in the air streams that were detected by the photoionization detectors. Multi-point calibrations occurred while the vapor generator was operated at the same gas flow rates as that used during the adsorption and regeneration tests to prevent any bias in the concentration measurements due to changes in gas flow rate and/or sample pressure. The gas generation system was then turned on and the gas stream by-passed the vessel until the organic vapor concentration achieved a specified steady-state value.

An adsorption cycle occurred by passing the vapor laden gas stream through the vessel at an MEK concentration of 500 ppmv and an inlet air flow rate of 100 slpm. The organic vapor laden air stream passed from the outside to the inside of the cartridge and then exited the vessel during the adsorption cycle. The concentration of the vapor at the outlet of the vessel was continuously monitored with the photoionization detector. Adsorption occurred until the outlet concentration reached a breakthrough concentration of 5% of the inlet concentration or until saturation of the adsorbent.

During desorption, power was supplied while dry and filtered air flowed at 10 or 20 slpm in the reverse direction that was used for the adsorption cycles. The outlet vapor concentration was monitored with the photoionization detector while the ACFC cartridge was heated. The vapor concentration was then compared to a predefined set-point value that represented the desired outlet vapor concentration. The proportional-integral-derivative feedback algorithm allowed the system to achieve the specified outlet concentration by controlling the power supplied to the ACFC that was based on set-points and measured vapor concentrations at the outlet of the vessel. An increase/decrease in the amount of power supplied to the cartridge resulted in an increase/decrease in the temperature of the ACFC and an increase/decrease in the amount of adsorbate that was emitted from the adsorbent. Consequently, the power supplied to the adsorbent acted as a correcting signal to reduce the difference between the set-point and measured outlet concentrations, which resulted in carefully controlled vapor concentrations at an independently controlled total gas flow rate. The total mass of MEK that desorbed during each desorption cycle ($m_d$) was calculated using a material balance for the MEK:

$$m_d = \frac{Q_{reg} P \, MW}{RT} 10^6 \sum_{t=0}^{t=t} (C_{out}) dt$$

where $Q_{reg}$ is the flow rate of air during desorption, P is the total gas pressure, MW is the molecular weight of the adsorbate, R is the ideal gas law constant, T is the temperature of the gas stream at the outlet of the vessel, $t_{reg}$ is the desorption time, and $C_{out}$ is the concentration of MEK at the outlet of the vessel during the regeneration cycle.

The differences between the set-point ($C_{setpoint}$) and the measured ($C_{out}$) concentration were characterized using the absolute relative difference (ARD), where N is the total number of samples:

$$ARD = \frac{1}{N}\sum^{N}\left[\frac{|C_{out} - C_{setpoint}|}{C_{setpoint}} \times 100\right]$$

Low Steady-State Concentration Test Results:

The MEK that was adsorbed onto the ACFC at 500 ppmv in air and at 100 slpm gas flow rate occurred until 5% breakthrough/saturation of the adsorbent was first desorbed at a set-point of 500 ppmv and at 20 slpm air to simulate a controlled feed to a destruction system, e.g., a biofilter. Measured MEK outlet concentrations during the steady-state desorption test for the microwave heated and electrical resistance heated systems was 506±22 ppmv (average±standard deviation) and 497±7 ppmv, respectively. The ARD between the $C_{setpoint}$ and $C_{out}$ values for the microwave heated and electrical resistance heated systems was 3.6 and 1.2%, respectively, with fluctuations in the concentration being at least partially attributable to variations in the power supplied during heating and measurement accuracy of the photoionization detector.

The average power for the microwave heated system was 37.7 W. For the electrical resistance heated system, the average power was 15.5 W.

High Steady-State Concentration Test Results:

Adsorption cycles removed 500 ppmv of MEK in air at 100 slpm until the adsorbent was saturated to prepare the adsorbent for desorption cycles with a set-point of 5,000 ppmv outlet concentration at 20 slpm air to simulate a feed for an oxidizer. The average measured concentrations during the desorption tests for the microwave heated and electrical resistance heated systems was 5,004±157 ppmv and 4,970±68 ppmv, respectively. As such both systems depicted a concentration ratio of 10. Lower or higher concentration ratios can be readily obtained. The ARD between $C_{setpoint}$ and $C_{out}$ for the microwave heated and electrical resistance heated systems was 2.3 and 3.7%, respectively.

The proportional integral derivative control algorithm can be tuned to smooth the applied power profile for desorption and stabilize the output concentration, and this was also tested. Fluctuations in output concentration values were reduced by changing the integration value of the proportional integral derivative algorithm above 50 minutes.

Dynamic-Tracking Concentration Test Results:

Dynamic tracking desorption tests caused the systems to follow carefully controlled transient set-points for the MEK's outlet concentration, which demonstrated the flexibility of the systems in terms of the quick response of the measured concentration to the variation in concentration set-point during regeneration. For example, the concentration of organic vapors and air flow rate for the feed stream to a biofilter can be adjusted separately to allow for a stable microbial population and efficient removal of the organic vapors from the gas stream. The organic vapor concentration and gas flow rate can also be adjusted upstream of an oxidizer to allow for safe and energy efficient oxidation of the vapors.

Adsorption cycles removed 500 ppmv of MEK in air at 100 slpm until the adsorbent was saturated to prepare the adsorbent for SST desorption cycles. The concentration set-point for the microwave heated system varied from 170 to 5,000 ppmv while the air flow rate was held at 20 slpm. The ARD between the set-point and the measured concentration ranged from 2.2 to 3.3%. The concentration set-point for the electrical resistance heated system varied from 250 to 5,000 ppmv at 10 and 20 slpm air flow rates. Both systems proved very responsive to set-point changes with an ARD between the measured and set-point concentrations ranging from 0.0 to 9.6%.

For the microwave heated system, the average power supplied to the system was 66.2 W. For the electrical resistance heated system, the average power was 22 W.

Concomitant Adsorption and Desorption Single Vessel Operation:

In a batch process, the adsorption cycle occurs first to capture the pollutants and then a regeneration (desorption) cycle is used to send sorbate onto a downstream destruction or collection system. The invention is also useful for concomitant adsorption and desorption (CAD) processes. In concomitant processes adsorption and desorption occur at the same time, either in separate or single vessels.

One preferred embodiment, discussed above, achieves concomitant adsorption and desorption using two separate vessels. Concomitant adsorption and desorption can also be achieved in a single vessel. Concomitant operation is achieved, for example, by increasing carrier gas flow rates to a level that produces a high enough convective heat loss to maintain the adsorbent, e.g. ACFC, near both the adsorption and desorption temperature. Power is applied under control of the proportional integral derivative controller as discussed above to maintain a set point output concentration, but the higher carrier flow rate results in a significantly different application of power and concomitant adsorption and desorption are achieved.

This was tested on a bench scale microwave heated example device, and the experiments will now be discussed. In this mode 98 slpm of air with nominal MEK concentration switching between 0 and 1,000 ppmv every 10 min is fed into an adsorption/regeneration vessel that contained 177 g of ACFC-15 that was partially preloaded with MEK. Variable inlet concentration was used to demonstrate the versatility of the system to treat widely varying inlet concentrations while still producing a constant specified outlet concentration. While MEK in the inlet gas stream gets adsorbed on the ACFC cartridge, microwave power is applied to maintain the concentration at the outlet of the vessel to match the set-point concentration of 500 ppmv. As such, the same carrier gas (i.e. air), is used to transport the MEK while it adsorbs and desorbs at the same carrier gas flow rate.

Concomitant Adsorption and Desorption (CAD) Test

During this test, both adsorption and desorption are occurring concomitantly, and are readily controlled to achieve a constant vapor concentration at the outlet of the vessel. In testing, MEK inlet concentration fluctuated between about 5 and 1020 ppmv every 10 min, resulting in an average concentration of 512 ppmv. The system was operated to maintain a set-point concentration of 500 ppmv. While the inlet MEK was adsorbing on the ACFC cartridge, microwave power was applied to desorb the MEK to achieve an outlet MEK concentration that is equal to the set-point value. The average outlet concentration was 500.1 ppmv which is within 0.02% of the set-point concentration. The ARD between the outlet and the set-point concentrations was 0.3% The excellent control that was achieved during the concomitant adsorption-desorption cycle is reflected by the small ARD value and illustrates the importance of tuning the proportional integral derivative control parameters. In this test, there is no separate clean air flow (see FIG. 8, clean airflow omitted).

During testing, the cartridge temperature quickly reached a steady-state value between 50 and 55° C. This is unlike the low and high concentration SST desorption tests discussed above, where the temperature continued to increase to 150° C. by the end of the regeneration test. This behavior is due to the quick heat dissipation by convection since the air flow rate in this test was five times the air flow rate during the low and high concentration SST desorption tests.

The power deposited to the system also quickly reached a steady-state level with an average value of 185.6 W which corresponds to 70.2 kJ/g of MEK desorbed. While the cartridge temperature in the concomitant operation test was much lower than the temperature in the low and high steady concentration SST desorption tests, the power and energy consumption was 16% higher during the concomitant operation test. This results from the need to heat the cartridge to desorb the MEK and the high convective heat loss that is decreasing the cartridge temperature (i.e. total gas flow rate during desorption was five times higher for the concomitant operation when compared to the SST tests), as explained above. Unlike the case of the SST tests, the cumulative energy during the concomitant operation test increased linearly with time since power deposition didn't depend on the fluctuation in inlet concentration.

Figure 10:
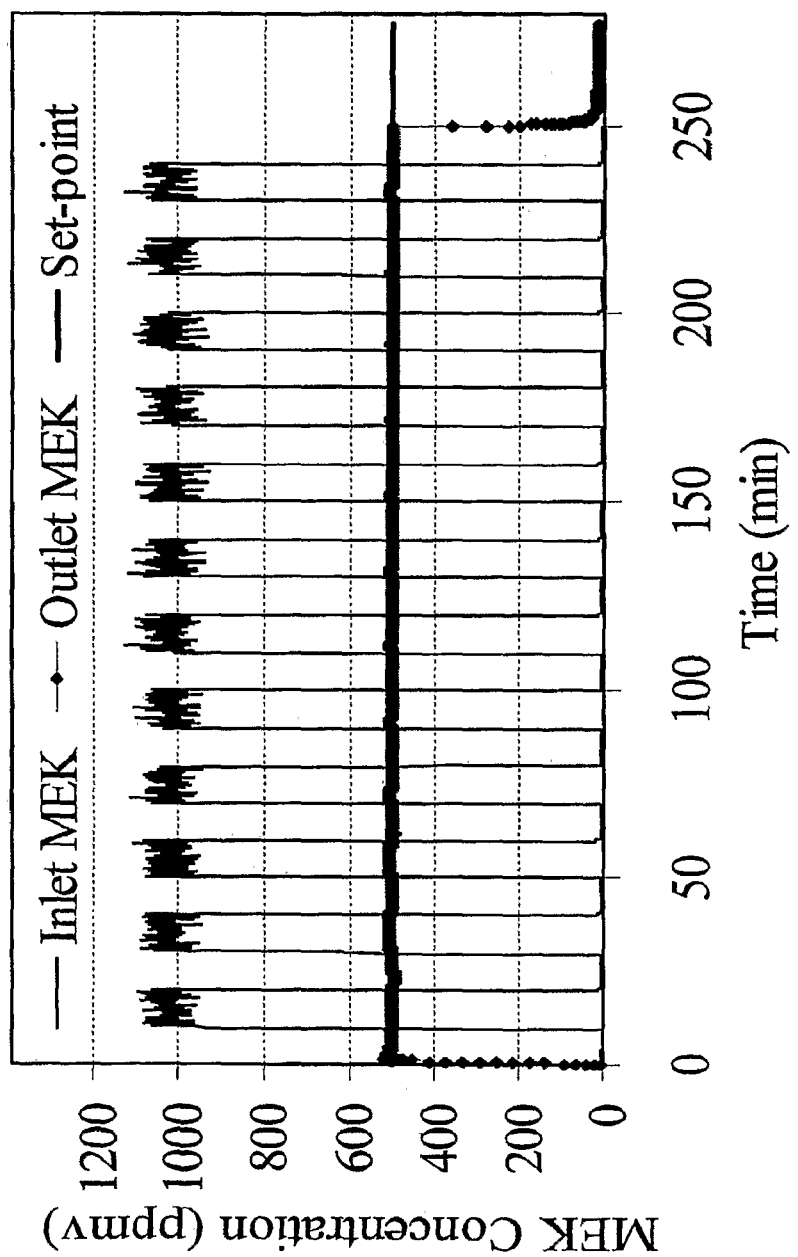
FIG. 10 shows results from a concomitant operation prototype test.

The cumulative mass of desorbed MEK increased linearly with time since the total gas flow rate and the MEK concentration were constant during the desorption cycle. The steady state amount of MEK adsorbed on the ACFC varied within a narrow limit (30 g to 33 g or 170 mg/g to 187 mg/g) depending on the inlet and outlet MEK concentrations. The amount of MEK adsorbed is important for sustainable operation of the system since having too much MEK adsorbed can exhaust the adsorption capacity of the ACFC and hence result in an outlet concentration that is higher than the desired set-point concentration. However, having too little MEK adsorbed can require higher power application and energy consumption to desorb the MEK to sustain the desired set-point value for the vessel's outlet concentration. FIG. 10 shows results from the concomitant operation prototype test specifically varying inlet vapor concentration, set-point outlet concentration, and constant outlet concentration during the concomitant adsorption-desorption test.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A steady state tracking desorption system, the system comprising:
    an electrically heated thermal adsorption/desorption device;
    a temperature sensor to sense the temperature of an adsorbent material within said adsorption/desorption device;
    a sorbate sensor to sense a sorbate level from an outlet of said adsorption/desorption device;
    a power sensor to sense the power supplied to said electrically heated thermal adsorption/desorption device; and
    controller means responsive to said temperature sensor, said sorbate sensor, and said power sensor for controlling power supplied to said electrically heated thermal adsorption/desorption device to achieve steady state tracking of a sorbate level set point from said outlet of said adsorption desorption device.

2. The system of claim 1, wherein said controller means comprises a controller running a proportional-integral-derivative control algorithm having inputs corresponding to levels determined by said temperature sensor, said sorbate sensor and said power sensor and an output corresponding to a power level to be supplied to said electrically heated thermal adsorption/desorption device.

3. The system of claim 1, wherein said controller means is responsive to control power supplied to said electrically heated thermal adsorption/desorption device to achieve steady state tracking of a fixed sorbate level set point from said outlet of said adsorption/desorption device.

4. The system of claim 1, wherein said controller means is responsive to control power supplied to said electrically heated thermal adsorption/desorption device to achieve steady state tracking of a changing sorbate level set point from said outlet of said adsorption/desorption device.

5. The system of claim 1, wherein said electrically heated thermal adsorption/desorption device comprises an activated carbon fiber cloth cartridge that is heated through electrical resistance.

6. The system of claim 1, wherein said electrically heated thermal adsorption/desorption device comprises an activated carbon fiber cloth cartridge that is heated through microwave energy.

7. A contaminant desorption and collection system comprising:
    a steady state tracking desorption system according to claim 1;
    a collection system receiving the output of said steady state tracking desorption system.

8. The system of claim 7, wherein said collection system comprises a biofilter system.

9. A contaminant desorption and destruction system comprising:
    a steady state tracking desorption system according to claim 1;
    a destruction system receiving the output of said steady state tracking desorption system.

10. The system of claim 9, said destruction system comprises an oxidizer system.

11. A steady state tracking desorption system, the system comprising:
    an electrically heated thermal adsorption/desorption device;
    a temperature sensor to sense the temperature of an adsorbent material within said adsorption/desorption device;
    a sorbate sensor to sense a sorbate level from an outlet of said adsorption/desorption device;
    a power sensor to sense power supplied by to said electrically heated thermal adsorption/desorption device; and
    a feedback controller that interprets levels sensed by said temperature sensor, said sorbate sensor and said power sensor and provides a signal to control power supplied to said electrically heated thermal adsorption/desorption device to achieve steady set point tracking of a sorbate level from said outlet of said adsorption/desorption device.

12. The system of claim 11, wherein said feedback controller comprises a controller running a proportional-integral-derivative control algorithm having inputs corresponding to levels determined by said temperature sensor, said sorbate sensor and said power sensor and an output corresponding to a power level to be supplied to said electrically heated thermal adsorption/desorption device.

13. The system of claim 11, wherein said feedback controller is responsive to control power supplied to said electrically heated thermal adsorption/desorption device to achieve steady state tracking of a fixed sorbate level set point from said outlet of said adsorption/desorption device.

14. The system of claim 11, wherein said feedback controller is responsive to control power supplied to said electrically heated thermal adsorption/desorption device to achieve steady state tracking of a changing sorbate level set point from said outlet of said adsorption/desorption device.

15. The system of claim 11, wherein said electrically heated thermal adsorption/desorption device comprises an activated carbon fiber cloth cartridge that is heated through electrical resistance.

16. The system of claim 11, wherein said electrically heated thermal adsorption/desorption device comprises an activated carbon fiber cloth cartridge that is heated through microwave energy.

17. A contaminant desorption and collection system comprising:
- a steady state tracking desorption system according to claim 11;
- a collection system receiving the output of said steady state tracking desorption system.

18. The system of claim 17, wherein said collection system comprises a biofilter system.

19. A contaminant desorption and destruction system comprising:
- a steady state tracking desorption system according to claim 11;
- a destruction system receiving the output of said steady state tracking desorption system.

20. The system of claim 19, said destruction system comprises an oxidizer system.

* * * * *

UNITED STATES PATENT AND TRADEMARK OFFICE
CERTIFICATE OF CORRECTION

PATENT NO. : 8,080,095 B2  
APPLICATION NO. : 12/296121  
DATED : December 20, 2011  
INVENTOR(S) : Rood et al.

Page 1 of 1

It is certified that error appears in the above-identified patent and that said Letters Patent is hereby corrected as shown below:

On the Title Page:
In "(57) ABSTRACT":
Line 5      After "device", please insert a --.--.

In the Drawings:
In FIG. 1, Box 15      Please delete "Encosure" and insert --Enclosure-- therefor.
In FIG. 1, Box 20      Please delete "Proportiona" and insert --Proportional-- therefor.

In the Specification:
Col. 5, line 47      After "heating", please insert --to--.

Col. 12, line 63      Please delete "$m_d = \dfrac{Q_{reg} P\, MW}{RT} 10^6 \sum_{t=0}^{t=t} (C_{out}) dt$" and insert $$m_d = \dfrac{Q_{reg} P\, MW}{R\, T} 10^6 \sum_{t=0}^{t=t_{reg}} (C_{out}) dt$$

-- therefor.

Col. 14, line 64      After "%", please insert a --.--.

In the Claims:
Col. 16, lines 45-46  
Claim 10      Please delete "comprises" and insert --comprising-- therefor.
Col. 18, lines 17-18  
Claim 20      Please delete "comprises" and insert --comprising-- therefor.

Signed and Sealed this  
Fifth Day of June, 2012

David J. Kappos  
*Director of the United States Patent and Trademark Office*